United States Patent [19]

Marden

[11] 4,171,114
[45] Oct. 16, 1979

[54] MOBILE AERIAL SUPPORT SYSTEM

[76] Inventor: Jay W. Marden, 2337 N. 21st Ave., Hollywood, Fla. 33020

[21] Appl. No.: 838,147

[22] Filed: Sep. 30, 1977

Related U.S. Application Data

[63] Continuation-in-part of Ser. No. 719,939, Sep. 2, 1976.

[51] Int. Cl.$^2$ .............................................. B64F 1/00
[52] U.S. Cl. .................................. 244/116; 244/17.17; 296/1 A; 114/261
[58] Field of Search .................... 244/116, 115, 114 R, 244/17.17, 17.15, 17.11; 296/1 A, 23 B, 1 R; 114/261, 262; 358/109

[56] References Cited

U.S. PATENT DOCUMENTS

| | | | |
|---|---|---|---|
| 2,765,938 | 10/1956 | Addezio | 296/1 A |
| 3,101,919 | 8/1963 | Madon | 244/17.17 |
| 3,677,425 | 7/1972 | Patten | 296/1 A |
| 3,785,316 | 1/1974 | Leming et al. | 244/116 |

FOREIGN PATENT DOCUMENTS

| | | | |
|---|---|---|---|
| 1216121 | 5/1966 | Fed. Rep. of Germany | 244/116 |
| 333706 | 1/1936 | Italy | 114/262 |
| 686608 | 1/1953 | United Kingdom | 244/17.11 |

OTHER PUBLICATIONS

Gernsback, "Radio-Controlled Television Plane," Television News, Mar.-Apr. 1931, pp. 10, 11, 75 and 76.

*Primary Examiner*—Galen L. Barefoot
*Attorney, Agent, or Firm*—Michael J. Gilroy

[57] ABSTRACT

A mobile aerial support system for use in support of ground operations comprises a helicopter and a mobile helicopter pad. The mobile pad consists of an open, drop-bed trailer adapted to bear and restrain the helicopter, a tractor adapted to pull the trailer with the helicopter mounted thereon, a four wheel drive vehicle adapted to be carried on the trailer adjacent said helicopter, an enclosure mounted on the trailer and tractor containing a complete workshop for maintenance and repair of the helicopter as well as a complete inventory of spare parts and accessories for the helicopter.

4 Claims, 1 Drawing Figure

U.S. Patent
Oct. 16, 1979
4,171,114
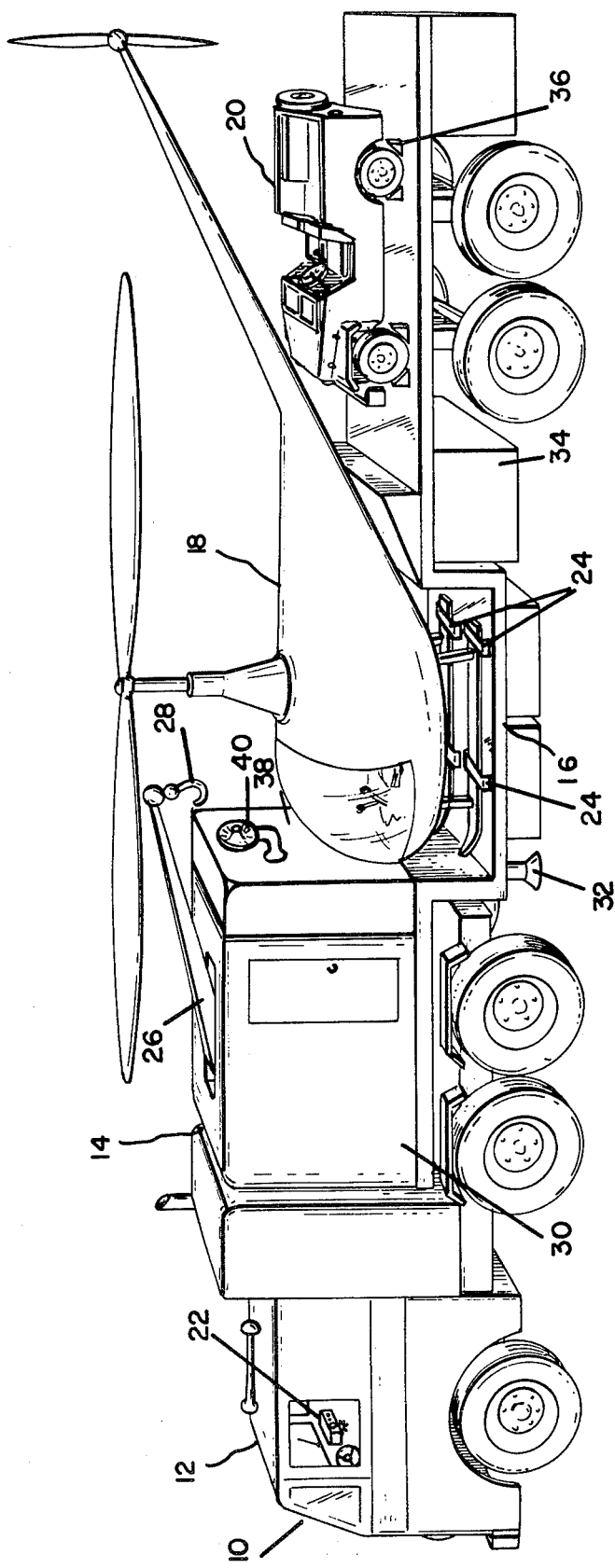

MOBILE AERIAL SUPPORT SYSTEM

RELATED APPLICATIONS

This application is a continuation-in-part of Ser. No. 719,939 filed Sept. 2, 1976.

BACKGROUND OF THE INVENTION

This invention relates generally to the field of aeronautics and relates particularly to the field of helicopter support systems.

Virtually every major ground-based operation, from search-and-rescue missions to the production of motion picturee to the construction of high rise office buildings, may be aided by the use of air-borne vehicles, due to their ability to cover wide areas with relative ease and to transport personnel or cargo with speed and efficiency. Thus during a search-and-rescue mission over water, long range search planes may be used to find the victims and, once found, helicopter-borne rescue teams may be dispatched to pick up the victims. Likewise, during the production of a motion picture, a director or producer may be unable to gauge the scope of a large scale production set from the ground, but may easily determine the appropriate course of action when viewing the same set from the air. Such observation would again be facilitated by the use of a helicopter.

Despite the obvious utility of helicopters in connection with many ground activities, the use of helicopters is severely limited by their dependence on ground support facilities. Thus, the helicopter may never stray more than a few hours from its source of fuel, service, and prescribed progressive maintenance. Moreover, the helicopter, to be continuously useful, must be close to a source of both parts and skilled labor for its repair and maintenance. Finally, the usefullness of a helicopter is limited by the fact that, should ground borne transportation be necessary at the remote site, the helicopter would be unable to provide such.

Because it is so dependent upon both a source of fuel and a source of repair, utilization of the helicopter to its full potential has never been realized. It is therefore an object of this invention to provide a support system for use in conjunction with the helicopter which will allow the use of that helicopter over long distances and for protracted periods of time in remote locations, which support system contains all elements for each of the total number of helicopter configurations, i.e., conversions equipment for each type of operation, i.e., water, rescue, search, litter, cargo carrying, construction, cable laying, firefighting, agricultural spraying, personal transportation, mapping, etc.

SUMMARY

I have discovered that the combination of a tractor, a helicopter, a trailer modified to mountingly engage a helicopter, a four wheel drive vehicle, and a storage area/workshop, will allow aerial support to be given to virtually any operation which can be reached by overground roads.

BRIEF DESCRIPTION OF THE DRAWINGS

The FIGURE is a perspective view of a mobile aerial support system in accordance with my invention.

DESCTIPTION OF THE PREFERRED EMBODIMENT

A complete understanding of my invention may be gained by those skilled in the art from the following description with reference to the drawing.

Referring to FIG. 1, tractor, 10, preferably of the "cab over engine" type has both a cab, 12, and an enclosure 14. Tractor 10 is removably attached to trailer, 16, by conventional attachment means as is well known to those skilled in the art. The tractor in its preferred embodiment will be of the double axle type having a four-:eleven rear end ratio, a sixteen speed, air shift (multiplex four by four) transmission, and will have ten aluminum hub wheels, such as those produced by Budd.

The cab of the tractor will be equipped with radio equipment, preferably a single side band AM/FM receiver and a 360 Navcom aircraft-type, two-way radio 22 equipped with a homing device for constant transmission of a homing signal.

The cab will preferably be double sized with a sleeper and will have a air slide fifth wheel. External loud speakers and emergency lights (mounted on top of the tractor) may be added if desired. Finally, an alarm system will protect the integrity of both the cab and the drom.

In its preferred form the trailer 16 will be either of the eight or ten wheel variety with a modified drop frame preferably constructed of aluminum-square tubing for maximum strength/weight ratio.

The trailer will generally be approximately 45 feet in length with variable widths of 8, 10 or 12 feet. The trailer will house a weatherproof machine shop or workshop 30 fabricated from metal or fiberglass. The machine shop will house a metal lathe, a drill press, a band saw, a 30 kilowatt generator powered either by diesel fuel or gasoline, a workbench, a tool stand, having all the necessary hand tools and hydraulic equipment for maintenance of the helicopter. In addition, the machine shop will be air conditioned and heated, and will have an electronics repair area, along with the appropriate equipment, for the maintenance of the electronic components of the system. Finally, the workshop will house a complete set of arc welding equipment including a T.I.G. system, complete air-powered tool equipment and, once again, an alarm system for maintaining the integrity of the machine shop. A crane 26, having an extendable means for attaching such as hook 28, and adapted to lift a helicopter from the ground adjacent the trailer, to the trailer bed may be mounted on the trailer or atop the tractor. The trailer itself will be equipped with hydraulic support legs 32 which may be deployed during the use of the crane. The support legs will deploy on either side of the trailer in order that the tractor and trailer will not become unstable and tip when the crane is in use.

The trailer will have tie down areas both for a helicopter, such as means 24 and for a four wheel drive vehicle, such as means 36, as further described below. There will be a deployable ramp, not shown, for loading and unloading the four wheel drive vehicle as well as fuel tanks 34 for aviation fuel, diesel fuel and gasoline. Finally, a high pressure air compressor and storage tank may be included.

The system will include a helicopter 18 of a type similar to the Hiller 12E, preferably equipped with an Allyson C250B turbine with a spare engine and accessory parts necessary to maintain the turbine located in the drom. Among those accessories with which the helicopter shall be equipped are floats, an external speaker siren system, a search light, preferably of at least 3½ million candle power equipped for remote operation, tropical doors, extended landing gear legs, twin heavy duty cargo racks that are attached to the legs, external cargo hook, auxiliary fuel tanks, agricultural spray equipment, undercarriage night lighting equipment, a rotor brake, left hand dual controls, a Mason type cyclic control grip, an inertia reel shoulder harness, a hydraulic rescue hoist, twin litters, waterproof cargo compartment and a heater/defroster.

The helicopter may be equipped with radio equipment and instruments such as a 360 Navcom radio, an automatic direction finder, a remote navigation system, a transponder, a high frequency radio, a single side band AM/FM radio, an encoding altimeter, a three-light market beacon, a glide scope, a non-tumbling attitude indicator, a D.G. (non-tumbling), a vertical speed indicator, a down beacon, an external cargo hook weight system means for giving digital weight read-out of the cargo hook load weight, identification strobe lights and camera platforms for both still and movie cameras.

Mounted on the trailer, in addition to the helicopter, will be a four wheel drive vehicle 20 such as a "jeep." The vehicle will be equipped with a cable hoist, either electric or hydraulic, a single side band AM/FM radio, a Navcom two-way radio, warn hubs allowing the two front wheels to run free, a four speed transmission, extra large tires and a roll bar. The vehicle may be loaded or unloaded using either the deployable loading ramps or the crane. Its use in coordination with the helicopter is facilitated by the inclusion of the two-way radio.

An optional feature of the system will be the inclusion of a housing 38 containing a dark room for the development of movies taken from the camera platform of the helicopter mounted on the trailer, pulled by the tractor. In addition to, or in lieu of, the dark room, the housing 38 may also be adapted to house a receiver, amplifier and re-transmitter for the reception, amplification, and re-transmission of an electronic signal from a portable television camera operated from the helicopter. Antennas 40 for the receiption of the television signal and for the re-transmission of an amplified signal may be mounted to the top of the housing or to any other convenient location of the trailer or the tractor.

The use of such a system removes those impediments to the full utility of a helicopter in ground operations. Firstly, the helicopter may be deployed to a remote site immediately upon need, with the tractor/trailer support system following along conventional roadways. By so doing, the helicopter may be fully operational on site immediately, with its support facility being only a matter of minutes or hours behind. Thus by storing such a system in a centrally located location, such as Knoxville, Tennessee, a fully operational helicopter could be on site anywhere east of the Mississippi River and south of Boston within 8 hours with its full support system less than an additional 4 hours behind.

Such a system will dramatically increase the tactical uses of helicopters in all ground operations due to its utility, ease of operation and mobility.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A mobile aerial support system for detachably transporting and providing ground support system for a helicopter, said helicopter having a first two-way radio communication device, comprising:
    a tractor adapted to pull a trailer and having a cab;
    a second two-way audio communication device mounted interiorly of said cab;
    a modified drop-frame trailer adapted to detachably connect to said tractor;
    means for detachably mounting a helicopter rigidly mounted to the top of said trailer;
    a tank adapted to contain fuel for said helicopter, said tank rigidly mounted to said trailer;
    a crane rotatably rigidly mounted to said trailer said crane having a boom extending to a point upwardly adjacent said helicopter mounting means and having an extendable means for attaching to said helicopter;
    an enclosure, adapted to house a plurality of replacement parts for said helicopter, said enclosure rigidly mounted to said trailer; and
    a workshop, rigidly mounted to said trailer and adapted to house a plurality of handpowered and mechanically operated tools for use in repair of said helicopter and said trailer on a level substantially the same as said helicopter mounting means and spaced therefrom.

2. A mobile aerial support system as set forth in claim 1, additionally comprising:
    vehicle mounting means for detachably mounting a four wheel drive vehicle, said vehicle mounting means rigidly mounted to the top of said flat-bed trailer; and
    a four wheel drive all purpose vehicle detachably mounted on said trailer by said vehicle mounting means at a level on said trailer substantially the same as that of said helicopter mounting means and spaced therefrom.

3. The mobile aerial support system as set forth in claim 2 additionally comprising a plurality of extendable rigid support legs mounted to said trailer and extendable therefrom into supporting contact with the ground.

4. The mobile aerial support system as set forth in claim 3 additionally comprising:
    a housing rigidly mounted to said flat-bed trailer;
    electronic signal reception, amplification and retransmission means detachably mounted interiorly of said housing; and
    antenna means detachably mounted exteriorly of said housing and operatively connected to said reception, amplification and retransmission means said antenna means for receiving and transmitting electronic signals.

* * * * *